United States Patent [19]

Maters et al.

[11] Patent Number: 5,071,481
[45] Date of Patent: Dec. 10, 1991

[54] LOW-TEMPERATURE CURABLE COMPOSITIONS BASED UPON POLYAROMATIC ALDEHYDE GROUP-CONTAINING COMPOUNDS AND KETIMINIZED POLYAMINO COMPOUNDS

[75] Inventors: Gerardus J. W. M. Maters, Bergen Op Zoom; Tamme Bartels, Vaassen; Arie Noomen, Voorhout, all of Netherlands

[73] Assignee: Akzo N.V., Netherlands

[21] Appl. No.: 461,206

[22] Filed: Jan. 5, 1990

[30] Foreign Application Priority Data

Jan. 13, 1989 [EP] European Pat. Off. ........ 89200076.1

[51] Int. Cl.$^5$ ................................................ C09D 4/00
[52] U.S. Cl. .................................. 106/287.2; 523/403
[58] Field of Search ........................ 523/403; 106/287.2

[56] References Cited

U.S. PATENT DOCUMENTS

| | | | |
|---|---|---|---|
| 3,291,775 | 12/1966 | Holm | 260/47 |
| 3,547,886 | 12/1970 | Gardner et al. | 260/47 |
| 3,793,417 | 2/1974 | Erikson et al. | 264/77.5 |
| 4,017,438 | 4/1977 | Jerabek et al. | 260/29.2 EP |
| 4,230,772 | 10/1980 | Swift et al. | 428/442 |
| 4,274,989 | 6/1981 | Tominaga et al. | 260/29.2 TN |
| 4,751,257 | 6/1988 | Tominaga | 523/414 |
| 4,762,903 | 8/1988 | Geist et al. | 528/107 |
| 4,865,704 | 9/1989 | Saatweber et al. | 204/181.7 |

FOREIGN PATENT DOCUMENTS

| | | |
|---|---|---|
| 0203296 | 12/1986 | European Pat. Off. . |
| 0240083 | 10/1987 | European Pat. Off. . |
| 0262720 | 4/1988 | European Pat. Off. . |
| 0264983 | 4/1988 | European Pat. Off. . |
| 1229840 | 4/1971 | United Kingdom . |

OTHER PUBLICATIONS

Search Report—Sep. 25, 1989.

Primary Examiner—William R. Dixon, Jr.
Assistant Examiner—Alan Wright
Attorney, Agent, or Firm—Louis A. Morris; James K. Poole; Bart E. Lerman

[57] ABSTRACT

A low-temperature curable composition is provided which is based upon a polyaromatic aldehyde group-containing compound and a ketiminized polyamino compound. These compositions display good stability, extended potlife, and a good balance of physical and mechanical properties making them suitable for a wide variety of coating, impregnating, sealing and bonding application.

21 Claims, No Drawings

LOW-TEMPERATURE CURABLE COMPOSITIONS BASED UPON POLYAROMATIC ALDEHYDE GROUP-CONTAINING COMPOUNDS AND KETIMINIZED POLYAMINO COMPOUNDS

The present application for patent is entitled to the benefit of an earlier filing date in foreign country under 35 U.S.C. 119, based on priority application Ser. No. 89200076.1, The Netherlands, filed Jan. 13, 1989, which is hereby incorporated by reference.

BACKGROUND OF THE INVENTION

The present invention relates generally to low-temperature curable compositions suitable for use in coatings applications. More particularly, the present invention provides such low-temperature curable compositions which are based upon an aldehyde group-containing compound and a ketiminized polyamino compound.

U.S. Pat. No. 4,230,772, incorporated by reference herein for all purposes, teaches a similar low-temperature curable composition comprising a crosslinked vinyl addition polymer having methacrylaldimine crosslinking groups, which is produced by mixing: (A) a vinyl addition homopolymer or copolymer of methacrolein; and (B) a compound having at least two amine-functional groups selected from primary amines and primary amine-generating groups. Methacrolein, however, is a highly toxic and relatively unstable compound, and its use is not desirable.

SUMMARY OF THE INVENTION

This present invention overcomes this disadvantage by providing a low-temperature curable composition based upon a polyaromatic aldehyde group-containing compound and a ketiminized polyamino compound.

As utilized herein, by "polyaromatic aldehyde group-containing compound" is it meant a compound which contains at least two aromatic aldehyde groups.

As just indicated, the low-temperature curable compositions of the present invention are suitable for use in, for example, coating, impregnating, sealing and bonding compositions, and especially in protective coating applications for wood, metal and other well-known substrates.

The low-temperature curable compositions of the present invention display good stability, extended pot-life, and a good balance of physical and mechanical properties making them especially well-suited for the aforementioned uses. This is accomplished without the use of methacrolein and inherent toxicity and stability problems.

These and other features and advantages of the present invention will be more readily understood by those skilled in the art from a reading of the following detailed description.

DETAILED DESCRIPTION OF THE PREFERRED EMBODIMENT

As previously indicated, the compositions of the present invention comprise, in their overall concept, a polyaromatic aldehyde group-containing compound and a ketiminized polyamino compound.

Suitable polyaromatic aldehyde group-containing compounds include, for example, the reaction products of an at least bifunctional epoxy compound with an hydroxy-functional aromatic aldehyde.

As examples of suitable at least bifunctional epoxy compounds, which can be solid or liquid, may be mentioned the di- or polyglycidyl ethers of (cyclo)aliphatic or aromatic hydroxyl compounds such as ethylene glycol, butane glycol, glycerol, cyclohexane diol, mononuclear di- or polyvalent phenols, bisphenols such as Bisphenol-A and Bisphenol-F, and polynuclear phenols; polyglycidyl ethers of phenol formaldehyde novolak; epoxidized and optionally hydrogenated divinyl benzene; epoxy compounds containing an isocyanurate group; epoxidized polyalkadienes such as epoxidized polybutadiene; hydantoin epoxy resins; epoxy resins obtained by epoxidation of aliphatic and/or cycloaliphatic alkenes such as dipentene dioxide, dicyclopentadiene dioxide and vinylcyclohexene dioxide; glycidyl groups-containing resins such as polyester or polyurethanes which contain two or more glycidyl groups per molecule; and mixtures of the epoxy compounds referred to hereinbefore. These epoxy compounds are well-known to those skilled in the art and need not be further described here.

It is preferred that use should be made of a (cyclo)aliphatic epoxy compound; a polymer of ethylenically unsaturated compounds with epoxy groups such as glycidyl (meth)acrylate, N-glycidyl(meth)acrylamide and/or allylglycidyl ether; and/or copolymers of these compounds with one or more other copolymerizable ethylenically unsaturated monomers. Especially preferred are glycidyl (meth)acrylate containing copolymers.

Suitable other copolymerizable ethylenically unsaturated monomers include, for example, acrylic and methacrylic acid and their alkylesters, other acrylic and methacrylic acid derivatives such as acrylamide, and acrylonitrile; vinyl aromatics such as styrene and vinyl toluene; maleic acid; fumaric acid; and the like. Particularly preferred of these are butyl (meth)acrylate, lauryl (meth)acrylate, 2-ethylhexyl acrylate, methyl methacrylate and styrene.

The aforementioned polymers and copolymers can be prepared by well-known radical polymerization techniques utilizing, for example, UV light, peroxide or azo-containing initiators such as hydrogen peroxide, cumene hydroperoxide, di-tert.butyl peroxide, benzoyl peroxide, tert.butyl perbenzoate, tert.butyl peroxytrimethyl hexanoate, azobisisobutyronitrile and azobisvaleronitrile.

As examples of suitable hydroxy-functional aromatic aldehydes may be mentioned salicylaldehyde (2-hydroxybenzaldehyde), 3-hydroxybenzaldehyde, 4-hydroxybenzaldehyde, 4-hydroxy-2-methylbenzaldehyde, 4-hydroxy-2,6-dimethylbenzaldehyde, 2-hydroxy-5-ethylbenzaldehyde and vanillin (4-hydroxy-3-methoxybenzaldehyde). Particularly preferred are the monohydroxy-functional aromatic aldehydes, especially salicylaldehyde and vanillin.

As indicated above, the polyaromatic aldehyde group-containing compound is produced by reacting the at least bifunctional epoxy compound with the hydroxy-functional aromatic aldehyde. Suitable reaction temperatures may vary widely but preferably range from about 80° C. to about 180° C., more preferably from about 100° C. to about 150° C. The reaction also preferably takes place in the presence of minor amounts (generally up to about 1 wt. % based upon the total weight of the components) of a suitable catalyst, preferably an organic or inorganic base. Especially preferred catalysts include tetra-ethyl ammonium bromide and tetra-butyl ammonium bromide.

The components are preferably reacted at an epoxy to OH (from the aromatic aldehyde) equivalents ratio of from about 1:0.1 to about 1:1.5, more preferably from about 1:0.5 to about 1:1.1.

The resulting polyaromatic aldehyde group-containing compounds can possess widely varying molecular weights ($M_n$), generally between about 290 and about 100,000, and more preferably between about 800 and about 15,000. Further, as indicated earlier, the aldehyde functionality of the polyaromatic aldehyde group-containing compounds is at least 2, and preferably between 2 and 10.

Examples of suitable ketimized polyamino compounds comprise the adducts produced by the condensation of a polyamino compound with a ketone. Such "ketimines" and methods of preparation are well-known in the art, as exemplified by the disclosures of GB 1 229 840, U.S. Pat. No. 3,291,775, and EP-A-203 296 and the equivalent, EP-A-240 083 U.S. Pat. No. 4,990,577 EP-A-262 720 and EP-A-264 983, all of which are incorporated by reference for all purposes, as well as previously incorporated U.S. Pat. No. 4,230,772.

The compositions of the present invention are cured by reacting these ketimines with the polyaromatic aldehyde group-containing compounds. Suitable reaction temperatures may vary widely but preferably range from about 0° C. to about 150° C., more preferably from about 15° C. to about 60° C. The reaction also preferably takes place in the presence of minor amounts (generally up to about 1 wt % based upon the total weight of the components) of a suitable catalyst, preferably an organic acid such as, for example, acetic acid, benzoic acid and paratoluenesulfonic acid.

The components are preferably reacted at an aldehyde to ketimine equivalents ratio of from about 1:0.5 to about 0.5:1, more preferably from about 1:0.8 to about 0.8:1.

Compositions based upon the aforementioned polyaromatic aldehyde groups-containing compounds and ketimines are useful as binders for coating, impregnating, sealing and bonding compositions, and are especially suited for use in protective coating applications.

These compositions of the present invention may contain minor amounts of solvents usually employed in the paint industry, such as aliphatic or aromatic hydrocarbons, esters, ethers, alcohols, ketones and ether acetates, and/or the usual additives such as pigments, fillers, levelling agents, foam suppressing agents, rheology controlling agents, catalysts such as organic carboxylic acids, antioxidants, UV-stabilizers and sag-control agents.

When utilized in coating applications, these compositions may be applied to a substrate in any suitable manner, such as by roller coating, spraying, brushing sprinkling, flow coating, or dipping. It is preferred that the composition should be applied by spraying. Suitable substrates include those of pretreated or non-pretreated metals, such as iron, steel, galvanized steel and aluminium, and wood, synthetic materials, paper or leather.

Curing of the applied coating may be carried out at the temperatures mentioned above, but very conveniently at temperatures of, for example, 0° to 30° C. Optionally, a curing temperature higher than 30° C. may be used so that the curing time can be reduced. If desired, the compositions may also be baked, for instance, at a temperature in the range of 60° to 120° C.

The foregoing more general discussion of the invention will be further exemplified by the following specific examples offered by way of illustration and not limitation of the above-described invention.

EXAMPLES

Preparation of ketiminized amino compounds

Ketimine 1

Into a reactor were successively charged (under a nitrogen atmosphere)
  476.8 g of 4,4'methylene bis(2-methyl cyclohexylamine) (available under the trademark Laromin C 260 from BASF),
  220.0 g of methyl isobutyl ketone,
  232.3 g of xylene and
  9.5 g of heptanoic acid,
and heated to boiling temperature. The resulting reaction water was removed by azeotropic distillation. After 2-3 hours 36 g of water (100% of theory) were distilled off.

The remaining solution was cooled to 100° C. after which, over a period of 1 hour, 368.0 g of 2-ethylhexyl acrylate were added. The reaction mixture was kept at 100° C. until the addition reaction was finished.

Next, 300.0 g of butyl acetate were introduced, the mixture was cooled to 60° C. over a period of hour, and 220.0 g of isophorone diisocyanate were added followed by 100.0 g of butyl acetate. The reaction mixture was kept at 60°-80° C. until isocyanate could no longer be detected, after which 175.0 g of n-butanol were added.

Finally, the resulting solution was cooled, filtered, and stored.

Ketimine 2

Into a reactor were successively charged 1332 g of isophorone diisocyanate and 0.6 g of dibutyl tin dilaurate. and heated to a temperature of 40° C.

Next, over a period of 2 hours, a solution of 354 g of hexane diol-1,6 in 531 g of methyl isobutyl ketone was added to the contents of the reactor. After one hour the resulting product had an isocyanate content of 11.5%.

In a separate reactor were successively charged
  707.4 g of dipropylene triamine,
  1188 g of methyl isobutyl ketone,
  632 g of toluene and
  14.1 g of a silica-alumina catalyst,
and heated to boiling temperature. The resulting reaction water was removed by azeotropic distillation, and after 7 hours 193.6 g of water (99.6% of theory) were collected.

The remaining solution was cooled to 60° C. after which, over a period of 2 hours, 2217 g of the seperately prepared isocyanate group-containing adduct were added. This reaction mixture was kept at a temperature of 60° C. for 1 hour, after which 606 g of n-butanol were added.

Finally, the resulting solution was cooled. filtered and stored.

Ketimine 3

Into a reactor were successively charged (under a nitrogen atmosphere)
  196.5 g of dipropylene triamine,
  330 g of methyl isobutyl ketone,
  131.6 g of toluene and
  2.0 g of formic acid, and heated to boiling temperature. The resulting reaction water was removed by azeotropic distillation, and after 20 hours 53.9 g of water (99.8% of theory) were collected.

The remaining solution was cooled to 60° C. after which, over a period of 2 hours, a solution of 297.7 g of a diglycidyl ether of Bisphenol-A (available under the trademark Epikote 828 from Shell Chemical) in 446.5 g of toluene was added to the contents of the reactor. This reaction mixture was kept at a temperature of 60° C. for 4 hours.

The resulting solution was cooled and stored without purification.

Preparation of aldehyde group-containing compounds

Resin A - Aromatic Aldehyde

Into a reactor were charged 450 g of xylene and heated to boiling temperature. Next was introduced, over a period of 3 hours, a mixture composed of
- 175.0 g of glycidyl methacrylate,
- 55.0 g of styrene,
- 170.0 g of butyl acrylate and
- 10 g of tert.butyl perbenzoate (available under the trademark Trigonox C from Akzo Chemicals).

followed by
- 58.0 g of xylene.

The reaction mixture was kept at boiling temperature until a conversion of over 98% was achieved.

To the above-prepared copolymer were added 4.0 g of tetraethyl ammonium bromide (TEAB) and 178,1 g of vanillin (epoxy:OH of 1.0:0.95), and the mixture was slowly heated to boiling temperature. The mixture was kept at boiling temperature until an epoxy oxygen content of 0.07% was attained. Obtained was a 57.9% solution of the aldehyde-functional compound A (Mn=2480), with an acid number of 3.3 and a viscosity of 297 cPa.

Resin B - Aromatic Aldehyde

Into a reactor were charged 500.0 g of xylene and heated to boiling temperature. Next was introduced, over a period of 3 hours, a mixture composed of
- 75.0 g of glycidyl methacrylate,
- 241.2 g of styrene,
- 183.3 g of butyl acrylate and
- 3.0 g of tert. butyl peroxy 3,5,5 trimethyl hexanoate (available under the trademark Trigonox 42 S from Akzo Chemicals).

The reaction mixture was kept at boiling temperature until a conversion of over 98% was attained.

To the above-prepared copolymer were added 2.5 g of tetraethyl ammonium bromide and 76.3 g of vanillin (epoxy:OH of 1.0:0.95), and the mixture was slowly heated to boiling temperature. The mixture was kept at boiling temperature until the solution had an acid number below 4.

Obtained was a 54.3% solution of the aldehyde-functional compound B (Mn=5780), with an acid number of 3.9 and a viscosity of 171 cPa.

Resin C - Aromatic Aldehyde

Into a reactor were charged
- 350.0 g of xylene,
- 2.0 g of tetraethyl ammonium bromide and
- 393.8 g of Novolac epoxy (EW=179) (reaction product of epichlorohydrin and phenolformaldehyde type resin available under the trademark DEN 438 from Dow Chemical).

and heated to boiling temperature.

Next, over a period 30 minutes, 263.0 g of salicylaldehyde were introduced (epoxy:OH of 1.0:0.98). The mixture was kept at boiling temperature until an epoxy oxygen content of 0.2% was attained.

After the introduction of 250.0 g of propylene glycol methyl ether (Commercially available as Dowanol PM from Dow Chemical), a 53.5% solution of the aldehyde-functional compound C (Mn=907) was obtained with an acid number of 0.4 and a viscosity of 30 cPa.

Resin D - Aromatic Aldehyde

Into a reactor were charged
- 350.0 g of xylene,
- 2.0 g of tetraethyl ammonium bromide and
- 393.8 g of Novolac epoxy (as above), which were heated to boiling temperature.

Next, over a period of 30 minutes, 197.3 g of salicylaldehyde were introduced (epoxy:OH of 1.0:0.735). The mixture was kept at boiling temperature until an epoxy oxygen content of 0.9% was attained.

After the introduction of 200.0 g of propylene glycol methyl ether (Dowanol PM), a 54.2% solution of the aldehyde-functional compound D (Mn=822) was obtained with an acid number of 0.5 and a viscosity of 24 cPa.

Resin E - Aliphatic Aldehyde

Into a reactor were charged 500 g of xylene and heated to boiling temperature. Next was introduced, over a period of 3 hours, a mixture composed of
- 75.0 g of glycidyl methacrylate,
- 241.2 g of styrene,
- 183.8 g of butyl acrylate and
- 3.0 g of tert. butyl peroxy 3,5,5 trimethyl hexanoate, followed by
- 50.0 g of xylene and
- 2.5 g of tert. butyl peroxy 3,3,5 trimethyl hexanoate.

The reaction mixture was kept at boiling temperature until a conversion of over 98% was achieved.

To the above-prepared copolymer were added 2.5 g of tetraethylammoniumbromide (TEAB) and 84.6 g of hydroxycitronellal (epoxy:OH of 1:0.95), and the mixture was slowly heated to boiling temperature.

After two days (16 hours) at boiling temperature the epoxy oxygen content was 0.8%, indicating no substantial conversion was achieved.

Resin F - Aliphatic Aldehyde (an aromatic hydrocarbon solvent containing trimethylbenzene, xylene, cumene and ethylbenzene which is available from Exxon Chemical Co., Houston TX)

Into a reactor were charged 500.0 g Solvesso 100 and 500 g special boiling point gasoline 140°–165° C., and heated to boiling temperature. Next was introduced, over a period of 3 hours, a mixture composed of
- 460.6 g of glycidyl methacrylate,
- 1071.0 g of styrene,
- 369.0 g of butyl acrylate,
- 100.0 g of lauryl methacrylate,
- 300.0 g of xylene and
- 140.0 g of tert. butyl peroxy 3,5,5 trimethylhexanoate, followed by
- 20.0 g of xylene.

The reaction mixture was kept at boiling temperature until a conversion of over 98% was reached.

Into a second reactor were charged
121.7 g of hydroxycitronellal,
106.7 g of hexahydrophthalic anhydride and
0.1 g of Fascat 4101 (available from M & T Chemicals Inc.) and heated to boiling temperature under ledding over nitrogen. The reaction mixture was kept at boiling temperature until an acid number of 209 on solution was achieved.

To the so-prepared adduct were added 850.0 g of the above-prepared glycidyl methacrylate copolymer and 0.2 g of chrome (III) 2-ethylhexanoate (available under the trademark Cordova AMC 2 from Cordova Chemical), and the mixture was slowly heated to 120° C. under ledding over nitrogen.

After about 2 hours at 120° C., gellation occured.

EXAMPLES 1-10

Coating composition were prepared by intermixing stoichiometric amounts of the polyaromatic aldehyde group-containing polymers (Resins A-D) and ketimines (Ketimines 1-3), at 20° C. and as set forth in Table 1.

As indicated above, the aliphatic aldehyde polymers (Resins E and F) were not useable.

The resulting coatings were applied by spraying onto a steel panel (Bonder No. 120) to a thickness of 40 μm after drying at 20° C. and a relative humidity of 65%.

Each of these coatings so produced was tested for potlife, hardness and solvent resistance. Potlife was measured as the time to a 100% increase in viscosity. The initial viscosity was set at 15 seconds (DIN cup 4) by addition of xylene as a solvent. The Persoz hardness of the coatings was determined by the Persoz pendulum test after, respectively, 1 and 7 days drying at 20° C. Solvent resistance was determined after one week drying by placing on the panel a small wad of cottonwool soaked with the respective solvent, followed by scratching the coating with a pencil of 2B hardness. The results are reported as a number (0 to 5), with 5 indicating excellent results (no hazing or decrease in hardness) down to 0 indicating poor results or extensive damage). The results are presented below in Table I.

TABLE I

| Ex. | Resin | Ketimine | Potlife (hr.) | Hardness (Persoz sec) 1 day | Hardness (Persoz sec) 7 days | Solvent Resist. Premium Grade Gasol. 5 min. | Solvent Resist. MEK 1 min. |
|---|---|---|---|---|---|---|---|
| 1 | A | 1 | 0.75 | 200 | 290 | 5 | 2 |
| 2 | B | 1 | 1 | 79 | 171 | 5 | 1 |
| 3 | B | 2 | 0.5 | 68 | 147 | 5 | 1 |
| 4 | B | 3 | 0.12 | 50 | 121 | 5 | 1 |
| 5 | C | 1 | 1 | 145 | 240 | 5 | 3 |
| 6 | C | 2 | 0.5 | 168 | 264 | 5 | 5 |
| 7 | C | 3 | 0.16 | 72 | 159 | 5 | 5 |
| 8 | D | 1 | 0.25 | 136 | 220 | 5 | 4 |
| 9 | D | 2 | 1.25 | 81 | 176 | 5 | 5 |
| 10 | D | 3 | 0.20 | 68 | 154 | 5 | 5 |

Many modifications and variations besides the embodiments specifically mentioned may be made in the compositions and methods described herein without substantially departing from the concept of the present invention. Accordingly, it should be clearly understood that the form of the invention, described herein is exemplary only, and is not intended as a limitation on the scope thereof.

We claim:

1. A curable composition comprising a polyaromatic aldehyde group-containing compound and a ketiminized polyamino compound in an aldehyde to ketimine equivalents ratio of from abut 1:0.5 to about 0.5:1.

2. The curable composition of claim 1, wherein the polyaromatic aldehyde group-containing compound comprises the reaction product of an at least bifunctional epoxy compound and an hydoxy-functional aromatic aldehyde.

3. The curable composition of claim 2, wherein the polyaromatic aldehyde group-containing compound comprises the reaction product of the at least bifunctional epoxy compound and the hydroxy-functional aromatic aldehyde at an epoxy to OH equivalents ratio of from about 1:0.1 to about 1:1.5.

4. The composition of claim 2, wherein the hydroxy-functional aromatic aldehyde comprises a monohydroxy-functional aromatic aldehyde.

5. The curable composition of claim 1, wherein the polyaromatic aldehyde group-containing compound comprises a number average molecular weight of from about 290 to about 100,000.

6. The curable composition of claim 1, wherein the polyaromatic aldehyde group containing compound comprises an aldehyde functionality of from 2 to 10.

7. A method of curing a curable composition comprising a polyaromatic aldehyde group-containing compound and a ketiminized polyamino compound, by reacting the polyaromatic aldehyde group-containing compound and ketiminized polyamino compound at a temperature of from about 0° C. to about 150° C. and at an aldehyde to ketimine equivalents ratio of from about 1:0.5 to about 0.5:1.

8. The method of claim 7, wherein the polyaromatic aldehyde group-containing compound comprises the reaction product of an at least bifunctional epoxy compound and an hydroxy-functional aromatic aldehyde.

9. The method of claim 8, wherein the polyaromatic aldehyde group-containing compound comprises the reaction product of the at least bifunctional epoxy compound and the hydroxy-functional aromatic aldehyde at an epoxy to OH equivalents ratio of from about 1:0.1 to about 1:1.5.

10. The method of claim 8, wherein the hydroxy-functional aromatic aldehyde comprises a monohydroxy-functional aromatic aldehyde.

11. The method of claim 7, wherein the polyaromatic aldehyde group-containing compound comprises a number average molecular weight of from about 290 to about 100,000.

12. The method of claim 7, wherein the polyaromatic aldehyde group containing compound comprises an aldehyde functionality of from 2 to 10.

13. A coating composition comprising a polyaroamtic aldehyde group-containing compound and a ketiminized polyamino compound in an aldehyde to ketimine equivalents ratio of from about 1:0.5 to about 0.5:1.

14. The coating composition of claim 13, wherein the polyaromatic aldehyde group-containing compound comprises the reaction product of an at least bifunctional epoxy compound and an hydoxy-functional aromatic aldehyde.

15. The coating composition of claim 14, wherein the polyaromatic aldehyde group-containing compound comprises the reaction product of the at least bifunctional epoxy compound and the hydroxy-functional aromatic aldehyde at an epoxy to OH equivalents ratio of from about 1:0.1 to about 1:1.5.

16. The coating composition of claim 14, wherein the hydroxy-functional aromatic aldehyde comprises a monohydroxy-functional aromatic aldehyde.

17. The coating composition of claim 13, wherein the polyaromatic aldehyde group-containing compound comprises a number average molecular weight of from about 290 to about 100,000.

18. The coating composition of claim 13, wherein the polyaromatic aldehyde group containing compound comprises an aldehyde functionality of from 2 to 10.

19. A method of coating a substrate by applying a coating composition comprising a polyaromatic aldehyde group-containing compound and a ketiminized polyamino compound, and curing the so-applied coating composition by reacting the polyaromatic aldehyde group-containing compound and ketiminzed polyamino compound at a temperature of from about 0° C. to about 150° C.

20. The method of claim 19 wherein said so-applied coating composition is cured in the presence of an organic acid catalyst.

21. The coating composition of claim 1 which further comprises at least one organic solvent.

* * * * *